(12) United States Patent
Yanagisawa

(10) Patent No.: US 12,556,807 B2
(45) Date of Patent: Feb. 17, 2026

(54) DISPLAY CONTROL DEVICE, DISPLAY CONTROL METHOD, AND STORAGE MEDIUM

(71) Applicant: CANON KABUSHIKI KAISHA, Tokyo (JP)

(72) Inventor: Takafumi Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/637,086

(22) Filed: Apr. 16, 2024

(65) Prior Publication Data
US 2024/0357226 A1    Oct. 24, 2024

(30) Foreign Application Priority Data
Apr. 18, 2023    (JP) .................. 2023-067655

(51) Int. Cl.
*H04N 23/63* (2023.01)
*H04N 23/617* (2023.01)
*H04N 23/661* (2023.01)

(52) U.S. Cl.
CPC ......... *H04N 23/632* (2023.01); *H04N 23/617* (2023.01); *H04N 23/661* (2023.01)

(58) Field of Classification Search
CPC .... H04N 23/60; H04N 23/633; H04N 23/631; H04N 23/62; H04N 23/617; H04N 23/632; G06F 3/04847; G06F 3/0481; H04W 12/06; H04W 4/003; G06Q 20/40145; G06Q 20/3227
See application file for complete search history.

(56) References Cited

U.S. PATENT DOCUMENTS

| | | | |
|---|---|---|---|
| 5,706,210 A | 1/1998 | Kumano et al. | |
| 2017/0109727 A1* | 4/2017 | Han | G06Q 20/3674 |

FOREIGN PATENT DOCUMENTS

JP    H08242229 A    9/1996

* cited by examiner

*Primary Examiner* — Xi Wang
(74) *Attorney, Agent, or Firm* — Canon U.S.A., Inc. IP Division

(57) ABSTRACT

In order to bring a display state of a GUI for controlling an imaging device into an appropriate state, a display control device includes at least one processor configured to cause graphical user interfaces (GUIs) for controlling the imaging device to be displayed on a display device; transmit a control command to the imaging device via a communication interface in response to an operation input from a user via the GUIs; and change a display state of a part of the GUIs in a case where change information indicating a predetermined state change is not received from the imaging device even after a predetermined standby time elapses from transmission of the control command to the imaging device.

9 Claims, 11 Drawing Sheets

FIG. 6

| GUI type as target of re-display | GUI type that is not target of re-display |
|---|---|
| Slider | Button |
| Toggle button | Long-press button |
| Toggle switch | |
| Pull-down | |

FIG. 8

| Function | Standby time |
|---|---|
| Insert/pull out infrared cut filter | 3s |
| Insert/pull out ND filter | 3s |
| Change iris | 1s |
| Change white balance | 0.5s |

FIG. 9

| Number of times | Actual elapse time | Standby time |
|---|---|---|
| First time | 0.5s | 0.5s |
| Second time | 1s | 0.5s |
| Third time | – | 1s |
| Fourth time | 0.5s | 1s |

DISPLAY CONTROL DEVICE, DISPLAY CONTROL METHOD, AND STORAGE MEDIUM

BACKGROUND

Field of the Disclosure

The present disclosure relates to a display control device, a display control method, a storage medium, and the like.

Description of the Related Art

Recently, systems that control imaging devices connected to networks from remote locations have increased in the market of video making. For such systems, there are applications capable of performing operations such as focusing, exposing, and the like while displaying videos imaged by the imaging devices.

Such an application transmits a command to change a state of a target function via a network in response to a user operation and updates display on graphical user interfaces (GUIs) in response to a state change notification of an imaging device. In Japanese Patent Laid-Open No. 8-242229, for example, a monitoring device performs polling for state monitoring on a transmission device that is a target of monitoring and monitors consistency of a state by comparing a result of the polling and management information held therein.

However, there may be a case where it is temporarily not possible to use a predetermined function due to a combination of a plurality of functions or a case where it is not possible to use a function due to an external factor such as an attached lens or the like depending on the imaging device to which the application is connected, for example.

In a case where it is temporarily not possible to use a target function of the imaging device when the imaging device is controlled by a user operation on the GUI of the application, a problem of inconsistency occurring between a display state on the GUI and a control state of the imaging device may occur.

SUMMARY

An object of some embodiments of the present disclosure is to solve the problem described above and to provide a display control device capable of bringing a display state of GUIs for controlling an imaging device into an appropriate state.

A display control device according to some embodiments of the present disclosure comprises: at least one processor configured to cause graphical user interfaces (GUIs) for controlling an imaging device to be displayed on a display device, transmit a control command to the imaging device via a communication interface in response to an operation input by a user via the GUIs; and change a display state of a part of the GUIs in a case where change information indicating a predetermined state change is not received from the imaging device even after a predetermined standby time elapses from transmission of the control command to the imaging device.

Further features of various embodiments of the present disclosure will become apparent from the following description of embodiments with reference to the attached drawings.

BRIEF DESCRIPTION OF THE DRAWINGS

FIG. 6 is a diagram illustrating an example in which whether a display control unit 503 is to re-display a GUI is distinguished for each UI type according to the first embodiment.

FIG. 8 is a diagram illustrating an example in which a standby time in Step S705 is changed for each control target function.

FIG. 9 is a diagram illustrating an example of a case where a predetermined standby time is automatically adjusted every time in Step S705.

DESCRIPTION OF THE EMBODIMENTS

Hereinafter, with reference to the accompanying drawings, example modes of the present disclosure will be described using embodiments. In each diagram, the same reference signs are applied to the same members or elements, and duplicate description will be omitted or simplified.

First Embodiment

Figure 1:
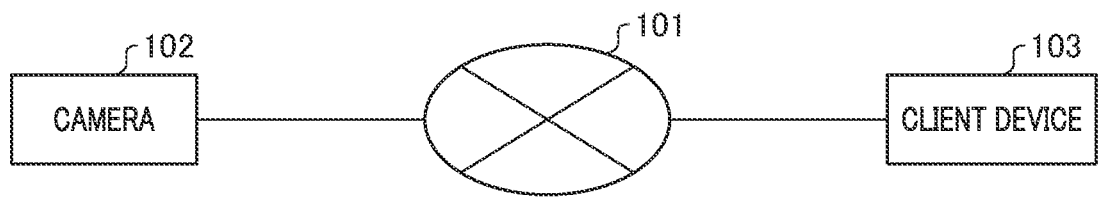
FIG. 1 is a diagram illustrating a camera system configuration example according to a first embodiment of the present disclosure.

FIG. 1 is a diagram illustrating a camera system configuration example according to a first embodiment of the present disclosure. A camera system according to the first embodiment includes a network 101, a camera 102, and a client device 103.

The network 101 is a network that establishes connection between the camera 102 and the client device 103. The network 101 is realized by a plurality of routers, switches, cables, and the like in accordance with a communication standard, such as ETHERNET®, for example.

Note that the network 101 may be realized by the Internet, a wired local area network (LAN), a wireless LAN, a wide area network (WAN), or the like.

The camera 102 captures image data and video data via a lens. In the first embodiment, the camera 102 transmits image data and the like captured in response to a request from the client device 103 and a state of the camera 102 through the network 101.

Note that image data may be actively transmitted from the camera 102 to the client device 103. The client device 103 is a general client terminal device, such as a personal computer (PC), a tablet, or a smartphone.

Figure 2:
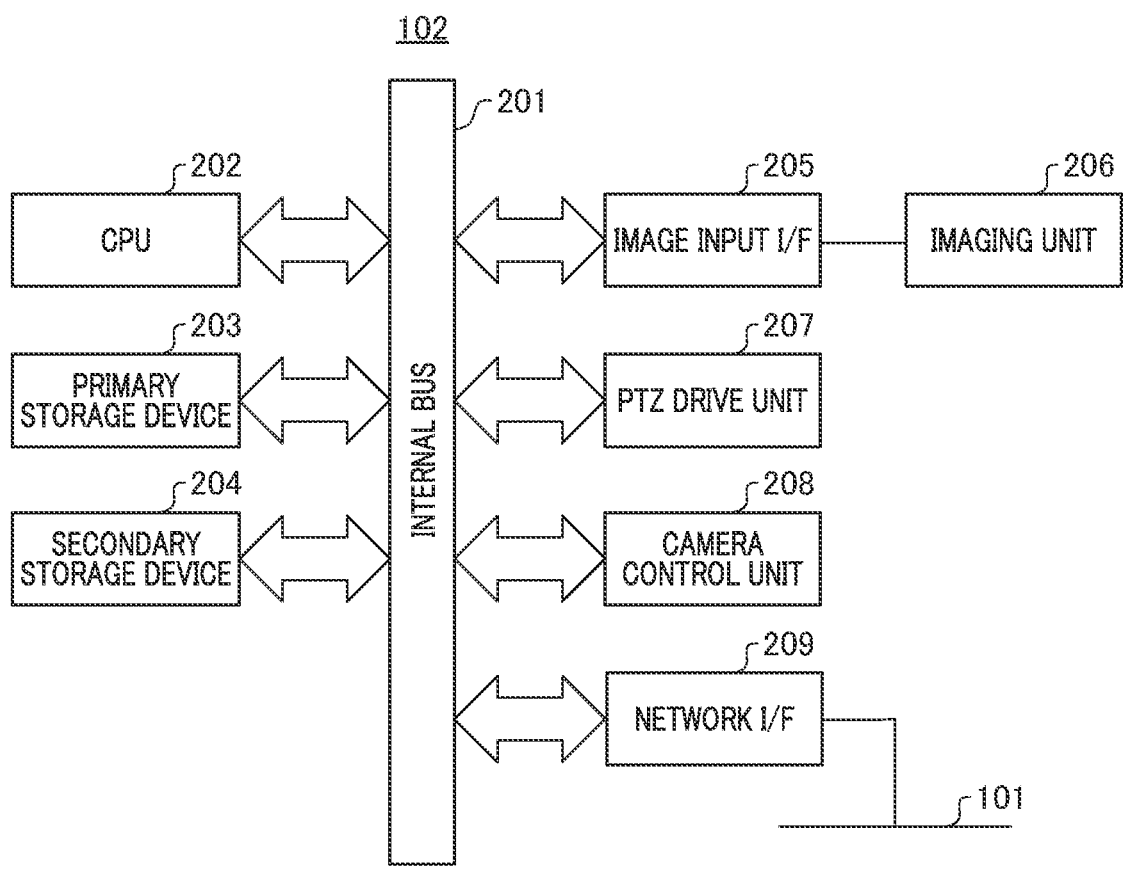
FIG. 2 is a diagram illustrating a hardware configuration example of a camera 102 as an imaging device according to the first embodiment.

FIG. 2 is a diagram illustrating a hardware configuration example of the camera 102 as an imaging device according to the first embodiment. The camera 102 includes an internal bus 201, a CPU 202, a primary storage device 203, a secondary storage device 204, an image input interface (I/F) 205, an imaging unit 206, a PTZ drive unit 207, a camera control unit 208, and a network I/F 209.

The network I/F 209 can be connected to the network 101. Note that PTZ is an abbreviation of pan, tilt, and zoom.

The CPU 202 is adapted to comprehensively control operations of the camera 102. The primary storage device 203 is a writable high-speed storage device, representative examples of which include a RAM. An operating system (OS), various computer programs, various kinds of data, and the like are loaded on the primary storage device 203, for example, and the primary storage device 203 is also used as a work area when the CPU 202 executes the OS, the various computer programs, and the like.

The secondary storage device 204 is a non-volatile storage device, representative examples of which include an HDD, a flash memory, and an SD card. The secondary storage device 204 is used as a storage region for an OS, various computer programs, various kinds of data, and the like.

The image input I/F 205 is an interface for inputting image data from the imaging unit 206. The imaging unit 206 forms an image on an imaging element, which is not illustrated, via a lens, which is not illustrated, captures the formed image, and outputs an image signal. Note that the lens may include a replaceable lens barrel.

The PTZ drive unit 207 controls PTZ of the camera 102 by controlling a motor and the like. Note that the PTZ drive unit 207 may be able to control at least one of pan, tilt, and zoom (PTZ).

The camera control unit 208 performs control in relation to imaging parameters, such as an aperture, a shutter, a gain, and a focus. The camera control unit 208 may further include an image processing function. The network I/F 209 is an interface for establishing connection to the network 101. Communication with the client device 103 is performed via the network I/F 209.

Figure 3:
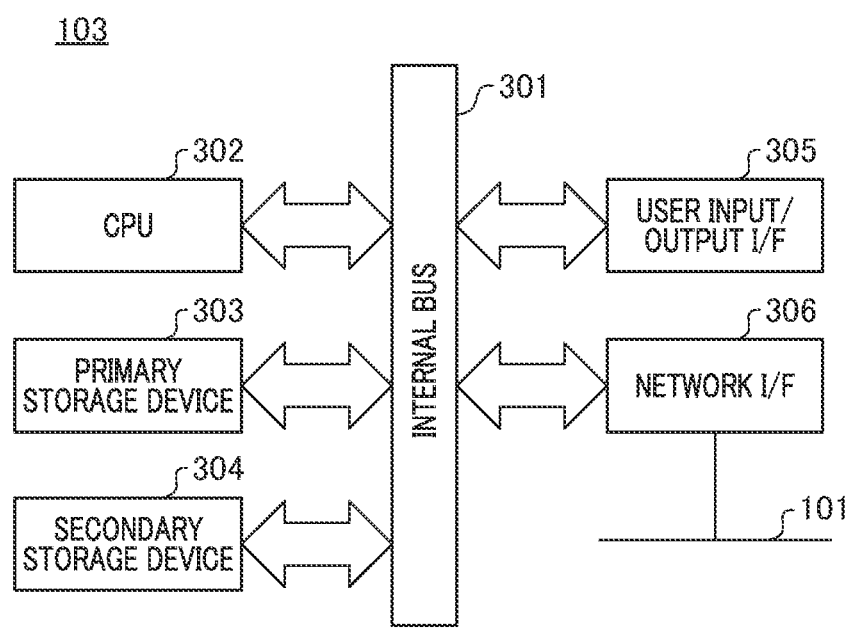
FIG. 3 is a diagram illustrating a hardware configuration example of a client device 103 as a display control device according to the first embodiment.

FIG. 3 is a diagram illustrating a hardware configuration example of the client device 103 as a display control device according to the first embodiment. An internal bus 301 is configured inside the client device 103. Also, the client device 103 includes a CPU 302, a primary storage device 303, a secondary storage device 304, a user input/output I/F 305, and a network I/F 306 connected to the internal bus 301.

The CPU 302 as a computer is adapted to comprehensively control operations of the client device 103. The primary storage device 303 is a writable high-speed storage device, representative examples of which include a RAM. An operating system (OS), various computer programs, various kinds of data, and the like are loaded on the primary storage device 303, for example, and the primary storage device 303 is also used as a work area when the CPU 302 executes the OS, the various computer programs, and the like.

The secondary storage device 304 is a non-volatile storage device, such as an HDD, a flash memory, or an SD card, for example. The secondary storage device 304 is used as a storage region for an OS, various computer programs, various kinds of data, and the like.

The user input/output I/F 305 is an I/F for the client device 103 to receive an operation from a user and to output user information that was input, a video from the camera, and the like to a display or the like, which is not illustrated. Examples of the user input/output I/F 305 include a display, a touch panel, a keyboard, a mouse, a microphone, and the like. Note that the touch panel and the display may be implemented together.

The network I/F 306 is an interface for establishing connection to the network 101. Network communication with the camera 102 is performed via the network I/F 306.

Figure 4:
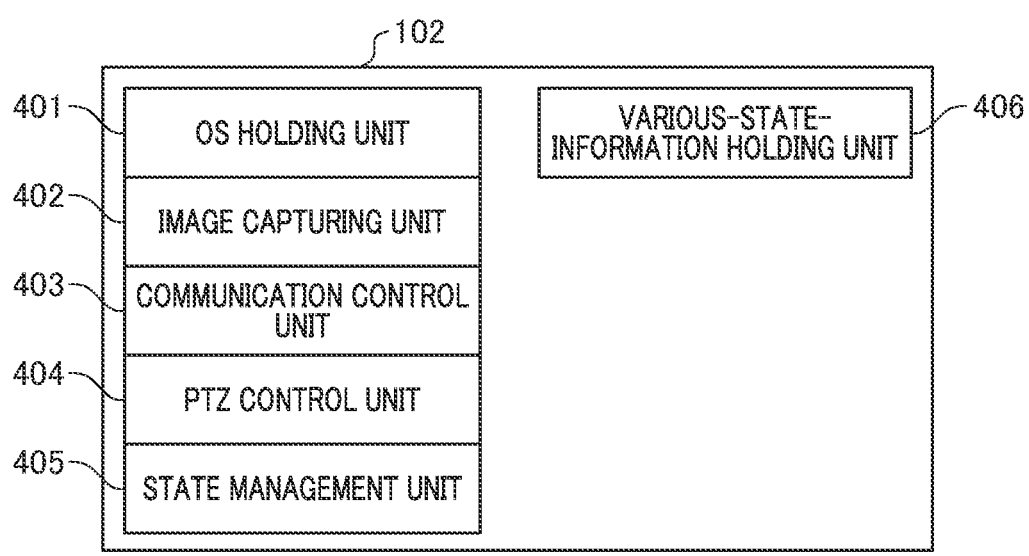
FIG. 4 is a functional block diagram of the camera 102 as the imaging device according to the first embodiment.

FIG. 4 is a functional block diagram of the camera 102 as the imaging device according to the first embodiment. Note that some of the functional blocks illustrated in FIG. 4 are realized by causing the CPU 202 as a computer included in the imaging device to execute the computer programs stored in the storage device as a storage medium.

However, some or all of them may be realized by hardware. As the hardware, it is possible to use an application specific integrated circuit (ASIC), a processor (a reconfigurable processor, a DSP), and the like. Also, the functional blocks illustrated in FIG. 4 may not all be incorporated in the same casing and may be configured by separate devices connected to each other via signal paths.

The camera 102 as the imaging device includes an OS holding unit 401, an image capturing unit 402, a communication control unit 403, a PTZ control unit 404, a state management unit 405, and a various-state-information holding unit 406. The OS holding unit 401 holds a basic program for controlling the entire camera 102.

The image capturing unit 402 acquires an image captured by the imaging unit 206 via the image input I/F 205 on the basis of an image acquisition request from the client device 103 or an instruction from another program. Also, the acquired image is converted into image data of JPEG or the like or video data of H.264 or the like by the image capturing unit 402.

The communication control unit 403 controls communication performed with the client device 103 via the network 101 by using the network I/F 209. As examples of content of the communication, reception of a request for acquiring an image captured by the imaging unit 206 and reception of a request for controlling PTZ to the PTZ drive unit 207 of the camera 102 are performed.

Note that for the request received from the client device 103, a general communication protocol, such as a hypertext transfer protocol (http), for example, may be used. The PTZ control unit 404 drives the PTZ drive unit 207 on the basis of a received command in a case where a control command or the like is received from the client device 103. Note that the PTZ control unit 404 also has a function of controlling the camera control unit 208.

The state management unit 405 manages states (PTZ positions, an aperture state, a current white balance value, and the like) of various functions of the camera 102. Note that the functions of the imaging device in the first embodiment include at least one of control functions or the like of PTZ, an aperture, a shutter, a gain, and a white balance, for example.

The state management unit 405 acquires the aforementioned various kinds of state information from the image capturing unit 402 and the PTZ control unit 404 and saves them in the various-state-information holding unit 406. Here, the various kinds of state information are information regarding states of various functions of the camera 102. Examples thereof include information regarding various functions that the imaging device has, such as current PTZ positions, states of an aperture, a shutter, and a gain, and a current white balance value.

Figure 5:
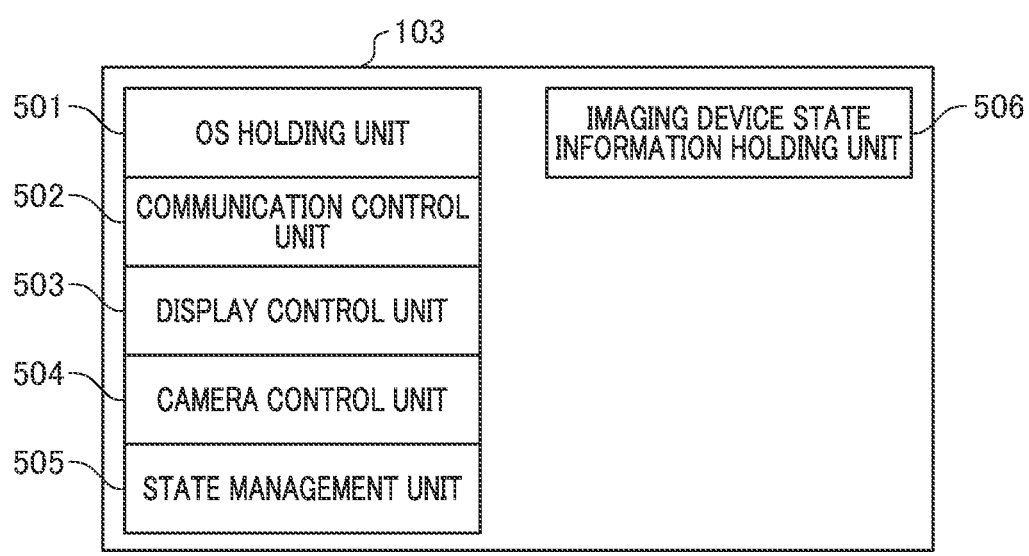
FIG. 5 is a functional block diagram of the client device 103 as the display control device according to the first embodiment.

FIG. 5 is a functional block diagram of the client device 103 as the display control device according to the first embodiment. Note that some of functional blocks illustrated in FIG. 5 are realized by causing the CPU 302 as a computer included in the client device 103 to execute the computer programs stored in the storage device as a storage medium.

However, some or all of them may be realized by hardware. As the hardware, it is possible to use an application specific integrated circuit (ASIC), a processor (a reconfigurable processor or a DSP), or the like. Also, each functional block illustrated in FIG. 5 may not be incorporated in the same casing and may be configured by separate devices connected to each other via signal paths.

The client device 103 includes an OS holding unit 501, a communication control unit 502, a display control unit 503, a camera control unit 504, a state management unit 505, and an imaging device state information holding unit 506. The OS holding unit 501 holds a basic program for controlling the entire client device 103. The communication control unit 502 controls communication performed with the camera 102 via the network 101 by using the network I/F 306.

Content of communication include transmission of an acquisition request for an image captured by the imaging unit 206 of the camera 102 and transmission of a PTZ control request to the PTZ drive unit 207 of the camera 102. Note that for the request transmitted to the camera 102, a general communication protocol, such as a hypertext transfer protocol (http), for example, may be used.

The display control unit 503 causes a display device which is one part of the user input/output I/F 305 included in the client device 103 to display video data acquired from the camera 102, icons for controlling the camera 102, and the like.

In other words, the display control unit 503 causes graphical user interfaces (GUIs) for controlling the imaging device to be displayed. Also, in the first embodiment, the display control unit 503 redisplays the GUIs on the basis of a condition, which will be described later in FIG. 6, after the camera control unit 504 controls the imaging device as will be described later.

Note that in a case where the user input/output I/F 305 includes a touch display or the like, the display control unit 503 can receive a touch operation or the like as an input from the user. The camera control unit 504 controls the camera 102 through the communication control unit 502 (communication unit) on the basis of an input from the user that is input to the user input/output I/F 305.

In other words, the camera control unit 504 transmits a control command to the imaging device via the communication unit in response to an operation input from the user via the GUIs. The camera control unit 504 provides requests for control of PTZ, an exposure, a white balance, and the like to the camera 102, for example.

The state management unit 505 manages various kinds of state information acquired by the communication control unit 502 from the camera 102. The state management unit 505 saves the acquired various kinds of state information in the imaging device state information holding unit 506. The imaging device state information holding unit 506 also holds information, such as current values and the like, of the various functions of the camera 102 managed by the state management unit 505.

FIG. 6 is a diagram illustrating an example in which the display control unit 503 distinguishing whether or not to redisplay GUIs for each GUI type according to the first embodiment. In other words, GUIs as targets of redisplay are assumed to be GUIs which themselves display states of the imaging device, such as a slider, a toggle button, a toggle switch, and the like. GUIs that are not targets of redisplay are assumed to be GUIs which themselves do not display states of the imaging device, such as a button and a long-press button.

Note that although whether or not to perform re-display is determined in accordance with the GUI types in regard to the states of the imaging device in the first embodiment, whether or not to execute re-display of the GUIs may be determined under another condition. In this manner, GUIs, display states of which are to be changed, and GUIs, display states of which are not to be changed, from among the plurality of GUIs in a case where display states of at least some of the GUIs are changed are stored in advance in the first embodiment.

Figure 7:
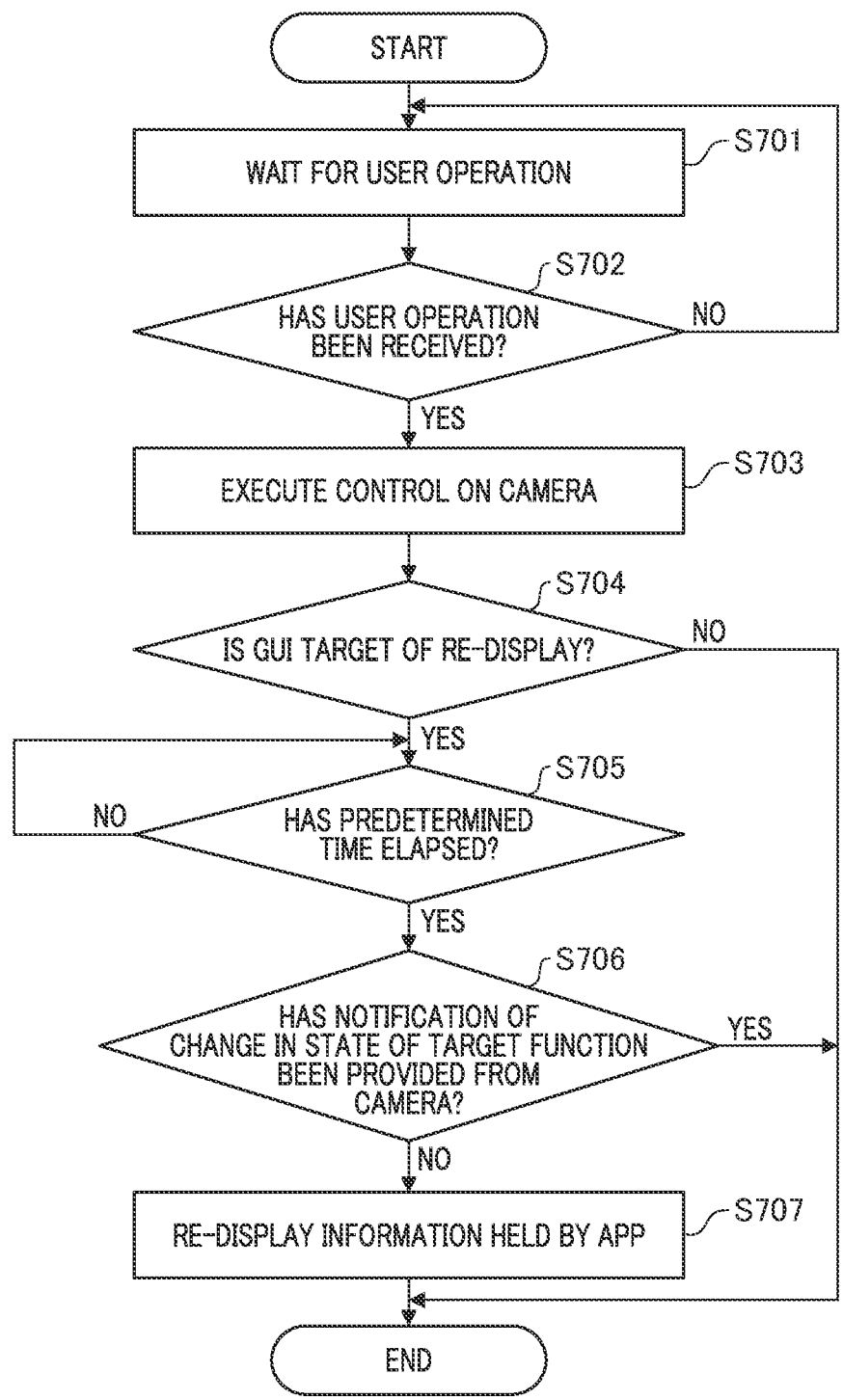
FIG. 7 is a flowchart illustrating an example of a display control method of re-displaying the GUI according to the first embodiment.

FIG. 7 is a flowchart illustrating an example of a display control method of re-displaying GUIs according to the first embodiment. Note that an operation in each step of the flowchart in FIG. 7 is sequentially performed by the CPU 302 as a computer inside the client device 103 executing the computer programs stored in the primary storage device 303, for example. Also, the flow in FIG. 7 is cyclically executed.

First, the user input/output I/F 305 waits for an input from the user in Step S701. Next, in Step S702, the user input/output I/F 305 checks whether or not there has been an input from the user. Here, the processing proceeds to Step S703 in a case where there has been a user input, or the processing proceeds to Step S701 in a case where there has been no user input.

Next, in Step S703, the camera control unit 504 transmits a control command for functions of the camera 102, which the user has operated, to the camera 102 through the network 101. Here, Step S703 functions as a control step of controlling the imaging device via the communication unit in response to the operation input from the user via a GUI.

Next, in Step S704, whether or not the type of the GUI is a GUI type as a target of re-display is determined. In the first embodiment, whether or not the type of the GUI is a target of re-display is determined on the basis of the conditions illustrated in FIG. 6. Here, the processing proceeds to Step S705 if the GUI is a target of re-display, or the flow in FIG. 7 is ended in a case where the GUI is not a target of re-display.

In Step S705, the display control unit 503 determines whether or not a predetermined standby time has elapsed. Here, the processing proceeds to Step S706 if the predetermined standby time has elapsed, or the processing returns to Step S705 if the predetermined standby time has not elapsed.

Next, in Step S706, the display control unit 503 checks whether or not there has been a notification of a change in state from the camera 102 in regard to the target function, the control instruction for which has been provided to the camera 102, on the basis of the imaging device state information held by the imaging device state information holding unit 506.

In a case where it is determined that the notification of a change in state of the target function has been provided from the camera 102 in Step S706, the flow in FIG. 7 is ended. In a case where there has been no notification of a change in state, the processing proceeds to Step S707. Next, in Step S707, the display control unit 503 re-displays the GUI on the basis of the information (reset position) held by an APP.

At that time, re-display is performed to achieve a predetermined reset state in which no control has been performed on the control target, by re-displaying the GUIs as targets of the re-display illustrated in FIG. 6. At this time, the GUIs that are not targets of re-display are not re-displayed. In other words, the display states thereof are not changed.

In other words, in Step S707, display states of at least some of the GUIs are changed in a case where change information indicating a predetermined state change has not been received from the imaging device even after a predetermined standby time elapses from transmission of the control command to the imaging device. Here, Step S707 functions as a display control step of displaying the GUIs for controlling the imaging device.

FIG. 8 is a diagram illustrating an example in which the standby time in Step S705 is changed for each control target function. In the first embodiment, a long standby time is set for functions of performing mechanical control, such as insertion, pulling-out, and the like of an infrared cut filter, an ND filter, and the like, and a short standby time is set for functions of performing electronic control, such as a change in white balance and the like, as illustrated in FIG. 8.

Also, a standby time is set to 1 s, for example, to change an iris (aperture) as illustrated in FIG. 8. Note that the standby time for the shutter or the gain may be set to 0.5 s, for example. In this manner, different standby times are set in accordance with functions as control targets of the control command or times required to control the functions in the first embodiment. However, the standby times may be set on the basis of other conditions.

FIG. 9 is a diagram illustrating an example of a case where the predetermined standby time is automatically adjusted every time in Step S705. In the example illustrated in FIG. 9, an example in which the predetermined standby time is set to 0.5 s (seconds) as a default, for example, for the first time and an actual elapse time until a change notification arrives after a control instruction is provided is 0.5 s is illustrated.

For the second time, the standby time is continuously set to 0.5 s since the standby time for the first time is 0.5 s and the actual elapse time until the change notification arrives for the first time is 0.5 s. Also, an example in which an actual elapse time until a change notification arrives for the second time is 1 s is illustrated.

In this case, the display control unit 503 redisplays the GUIs (that is, resets the display positions and the like of the GUIs to predetermined initial positions) after elapse of 0.5 s. However, the display control unit 503 then displays the GUIs as GUIs corresponding to display states when a control command is transmitted or display states in the camera 102 in response to a change notification from the camera 102.

The standby time for the third time is updated to 1 s since the actual elapse time for the second time is 1 s. An example of a case where the display control unit 503 redisplays the GUIs (that is, resets the display positions and the like of the GUIs to predetermined initial positions) after waiting for 1 s for the third time and no change notification arrives from the camera 102 thereafter is illustrated.

The standby time for the fourth time is 1 s, which is the longest until the third time. Note that a case where an actual elapse time until a change notification arrives is 0.5 s for the fourth time is illustrated. Note that an actual elapse time until a state change notification arrives may be measured for each function and the standby time may be changed for each function correspondingly.

In this manner, the standby time is changed on the basis of the time until change information is obtained from the imaging device after the control command is transmitted, that is, an actual elapse time taken until the change notification in a case where the same operation is executed, in the first embodiment. Furthermore, although the standby time is changed to the longest time, the standby time may be updated by using an average value or a standard deviation.

Note that in a case where lens replacement can be performed, for example, data regarding a response characteristic of the attached lens may be read from a memory in the lens barrel, and the standby time may be changed in accordance with the data regarding the response characteristic.

In other words, the default standby time may be short in a case of a lens with a satisfactory response characteristic while the default standby time may be long in a case of a lens with a poor response characteristic. In this manner, the standby time may be changed in accordance with the lens characteristic information in the imaging device.

As described above, the GUIs are re-displayed (that is, the display positions and the like of the GUIs are reset to predetermined initial positions) in a case where there has been no state change notification from the camera 102 after transmission of the control instruction to the camera 102 in the first embodiment.

In other words, the display states of the GUIs as targets of re-display at the time of the transmission of the control command are returned to the display states before the control command is transmitted. Instead, an error message indicating that the control has failed may be displayed. Alternatively, the GUIs as targets of re-display may be re-displayed, and also, the error message indicating that the control has failed may be displayed. Also, in a case where the control has failed, the fact may be saved as log data.

Therefore, it is possible to appropriately change display of the GUIs of the client device even in a case where the functions of the camera 102 are not compatible with the functions of the APP of the client device or a case where the control of the functions in the camera 102 has failed. Furthermore, only necessary parts are redisplayed by controlling whether or not to perform re-display (reset the display) in accordance with GUI types, and the user can easily know what kind of function for which the control has failed.

Second Embodiment

Next, a second embodiment of the present disclosure will be described. The second embodiment is partially different from the first embodiment in a flow of a client device 103. Note that description of the same configurations and contents as those described in the first embodiment will be omitted in the second embodiment.

Figure 10:
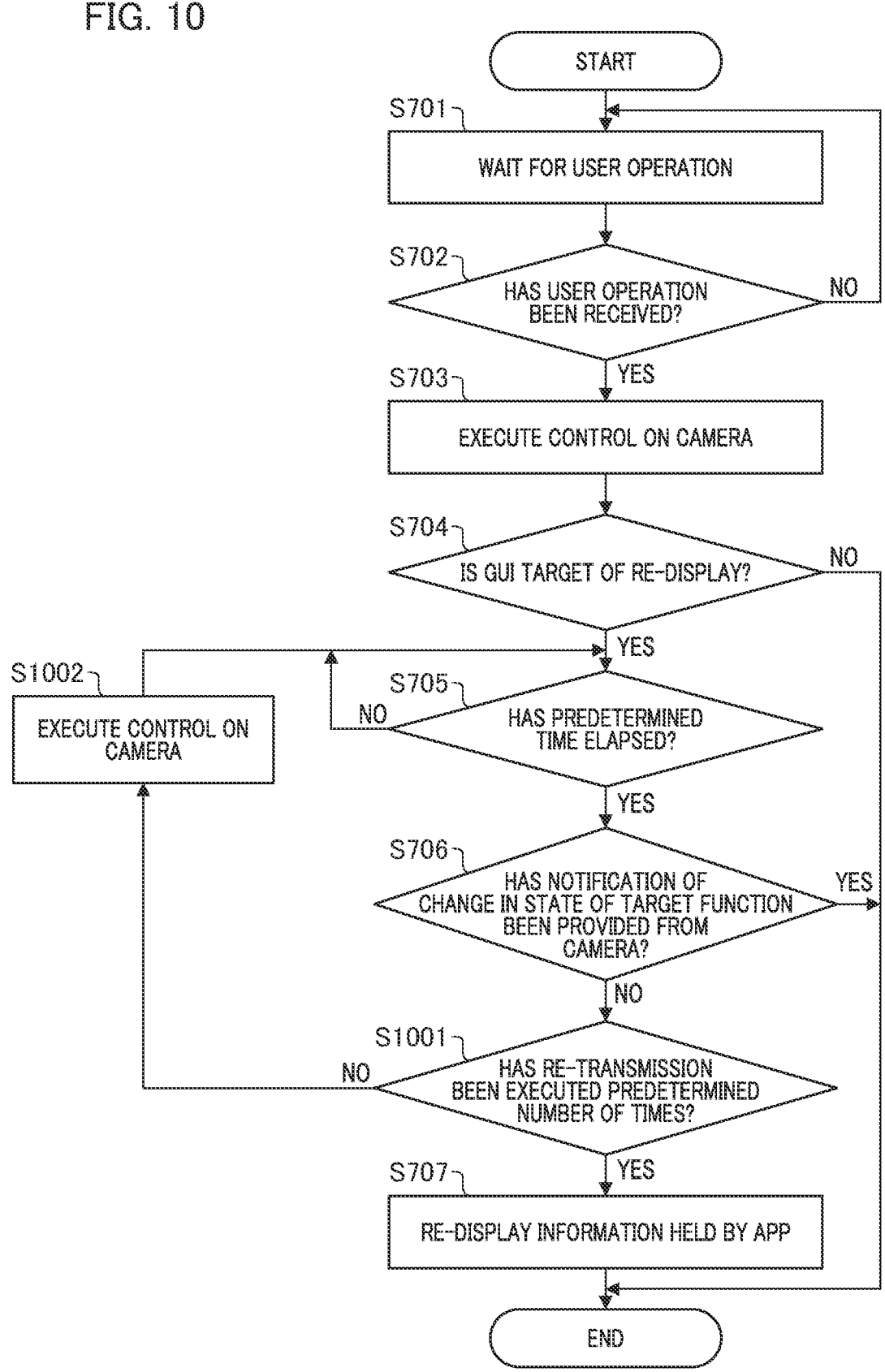
FIG. 10 is a flowchart illustrating an example of a display control method of re-displaying a GUI according to a second embodiment.

FIG. 10 is a flowchart illustrating an example of a display control method that redisplays GUIs according to the second embodiment. An operation in each step of the flowchart in FIG. 10 is sequentially performed by a CPU 302 as a computer inside the client device 103 executing computer programs stored in a primary storage device 303. Also, the flow in FIG. 10 is cyclically executed.

Since Steps S701 to S704 and Steps S706 and S707 are similar to those in the first embodiment, descriptions thereof will be omitted. In Step S706, the display control unit 503 determines whether or not there has been a notification of a change in state of a target function from a predetermined camera. The processing proceeds to Step S1001 in a case where the determination of no is made in Step S706, or the flow in FIG. 10 is ended in a case where determination of yes is made in Step S706.

Next, in Step S1001, the display control unit 503 determines the number of times the camera has been controlled. If retransmission has been executed a predetermined number of times, the processing proceeds to Step S707, and information (reset position) held by an APP is re-displayed. Also, in a case where it is determined that re-transmission has not been executed the prescribed number of times in Step S1001, the processing proceeds to Step S1002.

In other words, in a case where change information is not obtained from the camera 102, a control command is transmitted to the imaging device a predetermined number of times. In Step S1002, control is executed on the camera 102 again similarly to Step S703, and the processing proceeds to Step S705.

As described above, a probability that control based on a user's operation is reflected is raised by repeatedly transmitting a control instruction a predetermined number of times even in a case where it is not possible to use a target function of the camera 102 or the like in the second embodiment. Also, re-display of the GUIs is executed in a case where the control is still not reflected. It is thus possible to prevent inconsistency between the control state of the camera 102 and the display state of the client device 103.

Third Embodiment

Next, a third embodiment of the present disclosure will be described. The third embodiment is partially different from the first embodiment and the second embodiment in a flow of a client device 103. Note that description of the same configurations and content as those described in the first embodiment and the second embodiment will be omitted in the third embodiment.

Figure 11:
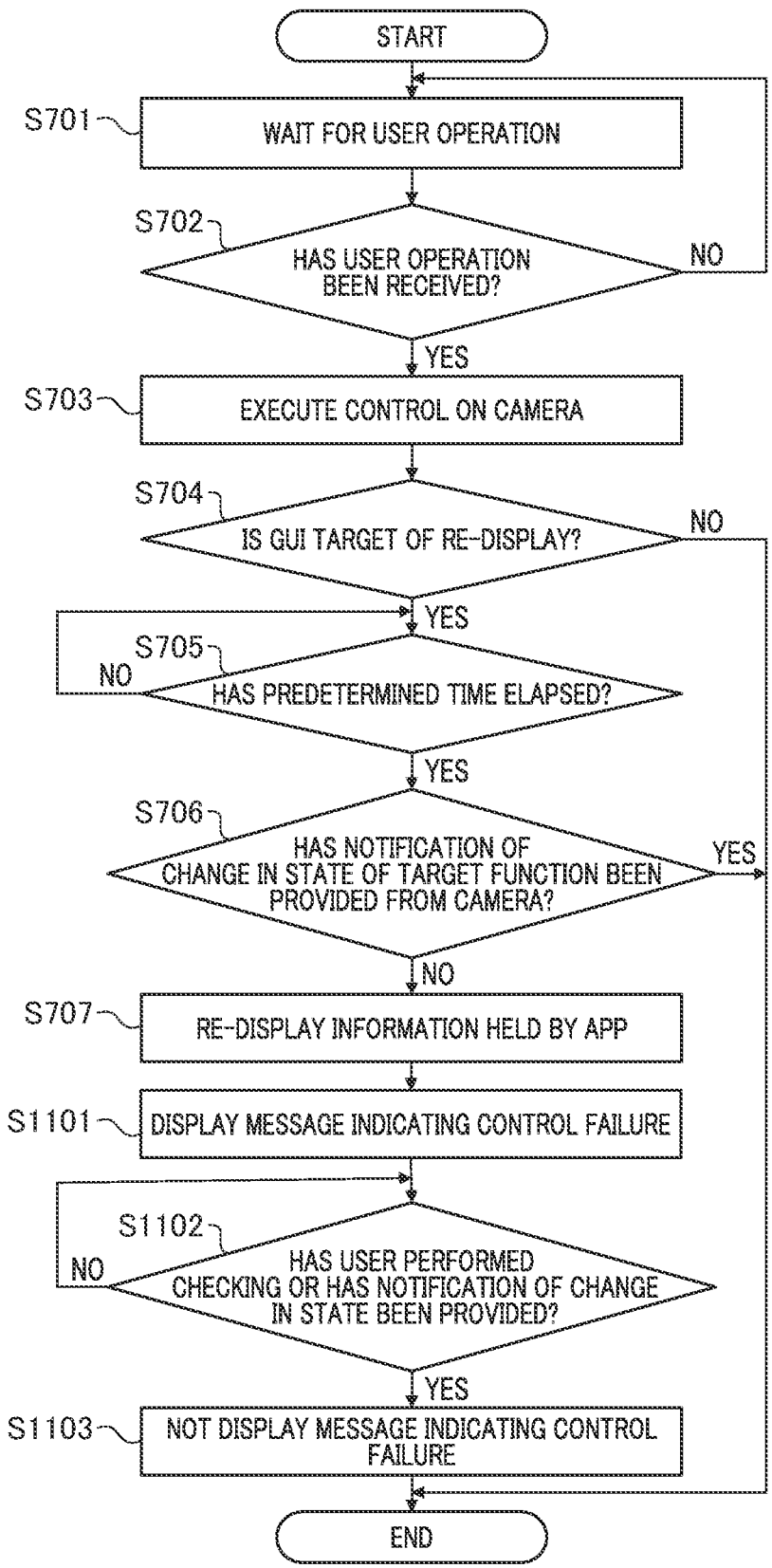
FIG. 11 is a flowchart illustrating an example of a display control method of re-displaying a GUI according to a third embodiment.

FIG. 11 is a flowchart illustrating an example of a display control method of re-displaying GUIs according to the third embodiment. Note that an operation in each step of the flowchart in FIG. 11 is sequentially performed by a CPU 302 as a computer in the client device 103 executing a computer program stored in a primary storage device 303 or the like. Also, the flow in FIG. 11 is cyclically executed. Note that Steps S701 to S707 are similar to those in the first embodiment, and description thereof will thus be omitted.

In Step S1101, the display control unit 503 displays a message indicating a control failure. Next, in a case where the message indicating a control failure is checked by a user or a notification of a change in state is provided during display of the message in Step S1102, the processing proceeds to Step S1103.

In a case where determination of no is made in Step S1102, the processing returns to Step S1102. In Step S1103, the display control unit 503 does not display the message indicating a control failure, which has been displayed in Step S1101. Also, in a case where a notification of a change in state has been provided in Step S1102, display states of the GUIs may be changed on the basis of the change in state.

As described above, according to the third embodiment, the user can easily recognize that the control has failed by displaying the message indicating a control failure at a timing when the re-display is executed in Step S707 according to the third embodiment.

While the present disclosure has described exemplary embodiments, it is to be understood that some embodiments are not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the display control device or the like through a network or various storage media. Then, a computer (or a CPU, an MPU, or the like) of the display control device or the like may be configured to read and execute the program. In such a case, the program and the storage medium storing the program constitute an embodiment of the present disclosure.

Also, some embodiments of the present disclosure include, for example, a configuration realized by using at least one processor or circuit configured to function according to the embodiments explained above. Note that a plurality of processors may be used to perform the processing in a distributed manner.

This application claims priority to Japanese Patent Application No. 2023-067655, which was filed on Apr. 18, 2023 and which is hereby incorporated by reference herein in its entirety.

What is claimed is:

1. A display control device comprising:
at least one processor configured to:
cause graphical user interfaces (GUIs) for controlling an imaging device to be displayed on a display device;
transmit a control command to the imaging device via a communication interface in response to an operation input by a user via the GUIs; and
change a display state of at least a part of the GUIs in a case where change information indicating a predetermined state change is not received from the imaging device even after a predetermined standby time elapses from transmission of the control command to the imaging device,
wherein the standby time is changed on the basis of a period of time until the change information is received from the imaging device after transmission of the control command.

2. The display control device according to claim 1, wherein in a case where the display state of at least a part of the GUIs is changed, information indicating a GUI of which the display state is to be changed and a GUI of which the display state is not to be changed is stored in advance.

3. The display control device according to claim 1, wherein the standby time differs in accordance with functions that are targets of control of the control command.

4. A display control device comprising:
at least one processor configured to:
cause graphical user interfaces (GUIs) for controlling an imaging device to be displayed on a display device;
transmit a control command to the imaging device via a communication interface in response to an operation input by a user via the GUIs; and
change a display state of at least a part of the GUIs in a case where change information indicating a predetermined state change is not received from the imaging device even after a predetermined standby time elapses from transmission of the control command to the imaging device,
wherein the standby time is changed in accordance with characteristic information of a lens in the imaging device.

5. A display control device comprising:

at least one processor configured to:

cause graphical user interfaces (GUIs) for controlling an imaging device to be displayed on a display device;

transmit a control command to the imaging device via a communication interface in response to an operation input by a user via the GUIs; and change a display state of at least a part of the GUIs in a case where change information indicating a predetermined state change is not received from the imaging device even after a predetermined standby time elapses from transmission of the control command to the imaging device, wherein the at least one processor is further configured to, in a case where the change information is not received, transmit the control command to the imaging device a predetermined number of times.

6. A display control method comprising:

controlling a display device to cause graphical user interfaces (GUIs) for controlling an imaging device to be displayed on the display device; and performing control to transmit a control command to the imaging device via a communication interface in response to an operation input by a user via the GUIs, wherein in the controlling of the display device, a display state of at least a part of the GUIs is updated in a case where change information indicating a predetermined state change is not received from the imaging device even after a predetermined standby time elapses from transmission of the control command to the imaging device, and wherein the standby time is changed on the basis of a period of time until the change information is received from the imaging device after transmission of the control command.

7. A non-transitory computer-readable storage medium configured to store computer-executable instructions that, when executed by a computer, cause the computer to perform a method comprising:

controlling a display device to cause GUIs for controlling an imaging device to be displayed on the display device; and performing control to transmit a control command to the imaging device via a communication interface in response to an operation input by a user via the GUIs, wherein in the controlling of the display device, a display state of at least a part of the GUIs is updated in a case where change information indicating a predetermined state change is not received from the imaging device even after a predetermined standby time elapses from transmission of the control command to the imaging device, and wherein the standby time is changed on the basis of a period of time until the change information is received from the imaging device after transmission of the control command.

8. A display control method comprising:

controlling a display device to cause graphical user interfaces (GUIs) for controlling an imaging device to be displayed on the display device; and performing control to transmit a control command to the imaging device via a communication interface in response to an operation input by a user via the GUIs, wherein in the controlling of the display device, a display state of at least a part of the GUIs is updated in a case where change information indicating a predetermined state change is not received from the imaging device even after a predetermined standby time elapses from transmission of the control command to the imaging device, and wherein the standby time is changed in accordance with characteristic information of a lens in the imaging device.

9. A display control method comprising:

controlling a display device to cause graphical user interfaces (GUIs) for controlling an imaging device to be displayed on the display device; and performing control to transmit a control command to the imaging device via a communication interface in response to an operation input by a user via the GUIs, wherein in the controlling of the display device, a display state of at least a part of the GUIs is updated in a case where change information indicating a predetermined state change is not received from the imaging device even after a predetermined standby time elapses from transmission of the control command to the imaging device, and wherein, in a case where the change information is not received, the control command is transmitted to the imaging device a predetermined number of times.

* * * * *